United States Patent [19]
Miller

[11] Patent Number: 5,917,298
[45] Date of Patent: Jun. 29, 1999

[54] ELECTRIC MOTOR CONTROL SYSTEM WITH RESISTOR NETWORK FOR AUTOMOBILE WIPER ASSEMBLY

[75] Inventor: Robin Mihekun Miller, Ellington, Conn.

[73] Assignee: UT Automotive Dearborn, Inc., Dearborn, Mich.

[21] Appl. No.: 08/947,708

[22] Filed: Oct. 9, 1997

[51] Int. Cl.⁶ .................................................. H02P 1/04
[52] U.S. Cl. ............................................ 318/444; 318/443
[58] Field of Search .................................. 318/443, 663, 318/666, 670, 444, 280; 324/691, 99 R, 99 D

[56] References Cited

U.S. PATENT DOCUMENTS

| | | |
|---|---|---|
| 2,615,945 | 10/1952 | Jaeschke . |
| 2,659,237 | 11/1953 | Wood . |
| 2,722,617 | 11/1955 | Cluwen et al. . |
| 2,959,803 | 11/1960 | Ziegler . |
| 3,361,005 | 1/1968 | Carpemter . |
| 3,421,380 | 1/1969 | Mansour . |
| 3,442,146 | 5/1969 | Simpson . |
| 3,443,442 | 5/1969 | Schweihs . |
| 3,443,455 | 5/1969 | Zugel . |
| 3,523,204 | 8/1970 | Rand . |
| 3,574,882 | 4/1971 | Petry . |
| 3,659,128 | 4/1972 | Danek . |

(List continued on next page.)

FOREIGN PATENT DOCUMENTS

| | | |
|---|---|---|
| 0 345 002 A2 | 6/1989 | European Pat. Off. . |
| 822 178 | 11/1951 | Germany . |
| 28 16 207 A1 | 10/1979 | Germany . |
| 3807087 A1 | 9/1989 | Germany . |
| 39 23 688 A1 | 1/1991 | Germany . |
| 43 13 363 A1 | 11/1993 | Germany . |
| 43 37 760 A1 | 5/1994 | Germany . |
| 56-22150 | 2/1981 | Japan . |
| 5-86761 | 4/1993 | Japan . |
| WO 96/33891 | 10/1996 | WIPO . |
| WO 96/33892 | 10/1996 | WIPO . |
| WO 96/33893 | 10/1996 | WIPO . |

OTHER PUBLICATIONS

Patent Abstracts of Japan, vol. 016, 7–438 (M–1309), 11 Sep. 1992 for JP Patent Publication No. 04151351.

P. 100, *Machine Design*, 60(1988) Oct. 13, No. 24, Cleveland, Ohio, US.

"Goodheart–Wilcox Automotive Encyclopedia", William K. Toboldt, Larry Johnson, Steven W. Olive, 1989, pp. 723–727.

"Automotive Handbook", Bosch 3rd Edition, 1993, pp. 694–697.

(List continued on next page.)

*Primary Examiner*—William M. Shoop, Jr.
*Assistant Examiner*—Rina Duda
*Attorney, Agent, or Firm*—Harness, Dickey & Pierce, P.L.C.

[57] ABSTRACT

An electric motor control system for a motor vehicle rear wiper assembly. The system includes an electric motor including a motor housing. A gear mechanism is coupled to the electric motor to selectively connect the motor to a motor application. A plurality of resistive contacts are located either on the motor housing or on the gear mechanism and are arranged in a predetermined resistance pattern to indicate motor operational data. A controller is connected to the motor and is programmed to control operation of the motor. A contact mechanism is connected opposite the resistive contacts either on the gear mechanism or the motor housing to selectively contact one of the plurality of resistive contacts dependent upon a selected motor application. A resistance measuring device is connected between the wiper and the controller to generate a sensed resistance signal and communicate the sensed resistance signal to the controller for motor control purposes. Exact output location can be determined at any time. The present electric motor control system significantly reduces the piece cost, assembly cost and wiring costs when compared to similar conventional electric motor control systems.

25 Claims, 6 Drawing Sheets

U.S. PATENT DOCUMENTS

| | | |
|---|---|---|
| 3,665,772 | 5/1972 | Beard et al. . |
| 3,688,332 | 9/1972 | Bellware . |
| 3,689,817 | 9/1972 | Elliott . |
| 3,694,723 | 9/1972 | Schneider et al. . |
| 3,803,627 | 4/1974 | Schuscheng . |
| 3,917,330 | 11/1975 | Quantz . |
| 3,927,436 | 12/1975 | Inoue et al. . |
| 4,009,952 | 3/1977 | Badalich et al. . |
| 4,065,234 | 12/1977 | Yoshiyuki et al. . |
| 4,158,159 | 6/1979 | Orris et al. . |
| 4,173,055 | 11/1979 | Izumi et al. . |
| 4,183,114 | 1/1980 | Eden . |
| 4,259,624 | 3/1981 | Seibickle . |
| 4,271,381 | 6/1981 | Munz et al. . |
| 4,309,646 | 1/1982 | Liedtke et al. . |
| 4,336,482 | 6/1982 | Goertler et al. . |
| 4,352,299 | 10/1982 | Riggs et al. . |
| 4,422,522 | 12/1983 | Slavin et al. . |
| 4,434,678 | 3/1984 | Maus . |
| 4,492,904 | 1/1985 | Graham . |
| 4,507,777 | 3/1985 | Ono et al. . |
| 4,553,656 | 11/1985 | Lense . |
| 4,573,723 | 3/1986 | Morita et al. . |
| 4,630,178 | 12/1986 | Mugford et al. . |
| 4,639,065 | 1/1987 | Kohler et al. . |
| 4,660,698 | 4/1987 | Miura . |
| 4,664,217 | 5/1987 | Welch et al. . |
| 4,674,781 | 6/1987 | Reece et al. . |
| 4,702,117 | 10/1987 | Tsutsumi et al. . |
| 4,733,147 | 3/1988 | Muller et al. . |
| 4,810,563 | 3/1989 | DeGree et al. . |
| 4,875,053 | 10/1989 | Harada . |
| 4,878,398 | 11/1989 | Heinrich . |
| 4,885,512 | 12/1989 | Gille et al. . |
| 4,893,039 | 1/1990 | Isii . |
| 4,918,272 | 4/1990 | Nishikawa . |
| 5,007,131 | 4/1991 | Chevalier et al. . |
| 5,023,530 | 6/1991 | Ohashi et al. . |
| 5,045,741 | 9/1991 | Dvorsky . |
| 5,063,317 | 11/1991 | Bruhn . |
| 5,169,465 | 12/1992 | Riley . |
| 5,182,957 | 2/1993 | Bohmer et al. . |
| 5,214,440 | 5/1993 | Takahashi et al. . |
| 5,218,255 | 6/1993 | Horiguchi . |
| 5,222,775 | 6/1993 | Kato . |
| 5,228,239 | 7/1993 | Heo . |
| 5,251,114 | 10/1993 | Cantin et al. . |
| 5,274,875 | 1/1994 | Chou . |
| 5,291,109 | 3/1994 | Peter . |
| 5,333,351 | 8/1994 | Sato . |
| 5,355,061 | 10/1994 | Forhan . |
| 5,355,286 | 10/1994 | Flint . |
| 5,519,258 | 5/1996 | Stroven et al. . |
| 5,691,586 | 11/1997 | Yonnet et al. . |
| 5,694,812 | 12/1997 | Maue et al. . |

OTHER PUBLICATIONS

"Kinematic Analysis of Mechanisms", 1959, J.E. Shigley, pp. 228–231.

"Genevamation Indexing Drives", Jan. 12, 1995 Catalog No. 693, Geneva Mechanisms Corporation.

"Saab 900 Owners Workshop Manual", Haynes Publishing Group, 1979 through 1985, pp. 172–174, 237.

Machine Design, "Basics of Design Engineering", Jun. 1992, Article Mechanical Systems.

A paper from the Third Conference on Mechanisms, "A Survey of Intermittent–Motion", F.J.Bogardus, 1956, pp. 8–15.

Machine Design, Mechanisms for Intermittent Motion, Dec. 1951, Otto Lichtwitz, pp. 134–148.

"Mechanisms for Providing Intermittent Rotary Motion", Product Engineering, Aug. 1949, pp. 116–117.

Machine Design, "Mechanisms for Intermittent Motion, Part 2", Jan. 1952, Otto Lichtwitz, pp. 127–141.

Machine Design, "Mechanisms for Intermittent Motion, Part 3", Feb. 1952, Otto Lichtwitz, pp. 146–155.

Machine Design, "Mechanisms for Intermittent Motion, Part 4", Mar. 1952, Otto Lichtwitz, pp. 147–155.

A paper from the Third Conference on Mechanisms, "Designing for Intermittent Motion with Modified Starwheels", Karl E. Kist, pp. 16–20.

"Mechanisms for Engineering Design Motion, Circular, Intermittent", Chapter 3, S.B. Tuttle, John Wiley Co., pp. 33–51.

Machine Design, "Modifying Starwheel Mechanisms", Vandeman and Wood, Apr. 1953, pp. 255–261.

"Kinematics of Intermittent Mechanism III—The Spherical Geneva Wheel", Product Engineering, Oct. 1949, S. Rappaport, pp. 137–139.

Machine Design, "Mechanical Systems", Jun. 1992, pp. 130, 132, 168.

"Mechanisms and Dynamics of Machinery", Hamilton H. Mabie and Fred W. Ocvirk, John Wiley & Sons, 1957.

A paper from the International Congress & Exposition, SAE Technical Paper Series 960390, "Liftgate Multiplexed Node", Feb., 1996, H. Winston Maue, pp. 73–76.

"Panasert Microelectronics Assembly System", Panasonic Catalog Doc. No. TI–701–1–0196, Manufacturing Equipment Division, Matsushita Electric Industrial Co., Ltd., Dec., 1995, p. 15.

"Thermal Clad Thermal Managment Substrate", Bergquist Company.

Machine Design, "Potentiometer Takes The Heat", Edited by Martha K. Raymond, Dec. 1996, p. 54.

PCIM, "Metal–Backed Boards Improve Thermal Performance of Power Semis", Sep., 1989, PCIM Staff, Herb Fick, Al Pshaenich, Dave Hollander, and Scott Lindblom, Reprinted from the Sep., 1989 issue of Power Conversion & Intelligent Motion.

Electronics Engineers'Handbook, Second Edition, McGraw–Hill Inc., "Discrete Circuit Components"1982, pp. 7–80.

"Your Thermal Via Is A Dead End Without Bergquist Bond Ply", Bergquist Company.

U T Automotive, a United Technologies Company, "Advanced Electronic Packaging".

Wiper Position (Degrees)

ELECTRIC MOTOR CONTROL SYSTEM WITH RESISTOR NETWORK FOR AUTOMOBILE WIPER ASSEMBLY

BACKGROUND OF THE INVENTION

This invention relates generally to electronic control systems and specifically to an electric motor control system including a wiper mechanism that contacts one of a plurality of resistors arranged in a predetermined configuration to generate a motor control signal.

Vehicle rear wiper assemblies have become a standard feature on many present-day motor vehicles. Typically, these rear window wiper assemblies include a wiper blade mounted upon a bracket which is coupled to a wiper arm. The wiper arm is attached to a wiper shaft rotatably driven in a cyclical oscillating manner by a helical gear. A reversible, fractional horsepower, dc electric motor serves to actuate the helical gear through an armature shaft-mounted worm gear enmeshed therewith. This type of rear window wiper arrangement is usually mounted upon a pivoting liftgate of a minivan, station wagon, sport-utility vehicle or the like.

Examples of conventional window wiper assemblies and motor mechanisms are disclosed with the following U.S. Pat. Nos. 4,893,039 entitled "Windshield Wiper Motor" which issued to Isii on Jan. 9, 1990; 4,878,398 entitled "Driving Device for Window Wiper of Motor Vehicles" which issued on Nov. 7, 1989; 4,336,482 entitled "Rear Window Wiper Motor Control" which issued to Goertler et al. on Jun. 22, 1982; 4,259,624 entitled "Arrangement for Wiping a Vehicle Window" which issued to Seibicke on Mar. 31, 1981; 3,694,723 entitled "Motor Vehicle Windshield Wiper Having a Parking Position Outside the Wiper Area" which issued to Schneider et al. on Sep. 26, 1972; and, 3,665,772 entitled "Windshield Wiper Motor Link Depressed Park Mechanism" which issued to Beard et al. on May 30, 1972. All of these patents are incorporated by reference herewithin.

Some conventional vehicles also provide a rear window release lock or latch, actuated by a solenoid, which can be unlocked to allow for upward pivotal movement of the rear window in relation to the otherwise stationary liftgate. In combination therewith, a separate liftgate lock is often mounted upon the liftgate door for fastening the liftgate to the body to prevent inadvertent pivotal opening. This liftgate lock is traditionally operated by manual key or handle rotation, or through a separate electric motor or solenoid.

Additionally, separate motors and solenoids are required to actuate passenger door locks, antenna retraction mechanisms, headlamp cover retraction mechanisms, a fuel filler door lock and other similar functions. This increase in the number of electromagnetic devices has also resulted in the need for motor controllers to control motor operation based on data indicating the particular application being driven by the motor.

Referring to Figure A, present motor control systems include a motor application sensor including a high conductivity copper plate A1 affixed to a motor output, such as the gear A2. Multiple conductive wipers are in contact with the plate and generate motor positional signals, which are output to a motor controller (not shown). Thus, as the plate is rotated, the resistance pattern formed by the plate allows the controller to determine a particular motor application being run.

However, the above described motor control systems have associated drawbacks. For example, it is often difficult for the controller to determine the location of the wipers on the plate if the wipers are both located on an intermediate portion, such as the portion C, as the plate continuity has no variation along such a portion. In addition, conventional motor control systems have difficulty achieving smooth transitions during ramping up or down of motor speed, and often such systems result in abrupt stopping or starting of the motor, which result in motor backlash and wiper wear. Also, the present motor control systems have an associated stopping accuracy that depends directly upon the consistency and inertia of the motor gear output. During low torque/friction applications, the motor runs at maximum speed with high angular momentum. When the supply voltage is discontinued, the motor can continue to rotate several revolutions before stopping. In a heavily loaded, slow system, the stopping would be almost instantaneous resulting in a disparity and final motor position.

SUMMARY OF THE INVENTION

In accordance with the present invention, an electric motor control system is provided. The system is installed with a high resolution encoder in a motor vehicle wiper assembly that provides OEM custom wiper features such as programmable wiper angle, speed and parking capabilities. The electric motor control system includes a wiper/resistor network configuration that enables a motor controller to accurately determine the particular application being run by the motor at any gear output position. Through use of the wiper/resistor network configuration, the control system minimizes overall system cost and assembly requirements when compared to conventional wiper assembly control systems.

More particularly, the present invention provides an electric motor control system. The system includes an electric motor including a motor housing. A gear mechanism is coupled to the electric motor to selectively connect the motor to a motor application. A plurality of resistive contacts are located either on the motor housing or on the gear mechanism and are arranged in a predetermined resistance pattern to indicate motor operational data. A controller is connected to the motor and is programmed to control operation of the motor. A contact mechanism is connected opposite the resistive contacts either on the gear mechanism or the motor housing to selectively contact one of the plurality of resistive contacts dependent upon a selected motor application. A resistance measuring device is connected between the wiper and the controller to generate a sensed resistance signal and communicate the sensed resistance signal to the controller for motor control purposes.

Accordingly, the present electric motor control system significantly reduces the piece cost, assembly cost, wiring costs as compared to conventional electric motor control systems. In addition, due to its configuration, the motor control system of the present invention exhibits a high degree of reliability and accuracy when compared to present motor control systems. Additional advantages and features of the present invention will become apparent from the following description and appended claims, taken in conjunction with the accompanying drawings.

Additional advantages and features of the present invention will become apparent from the following description and appended claims, taken in conjunction with the accompanying drawings.

BRIEF DESCRIPTION OF THE DRAWINGS

Figure A is a front elevational view of a portion of a prior art motor control system.

FIG. 6 is a schematic diagram of a third embodiment of the present invention;

DETAILED DESCRIPTION OF THE PREFERRED EMBODIMENT

Figure 1:
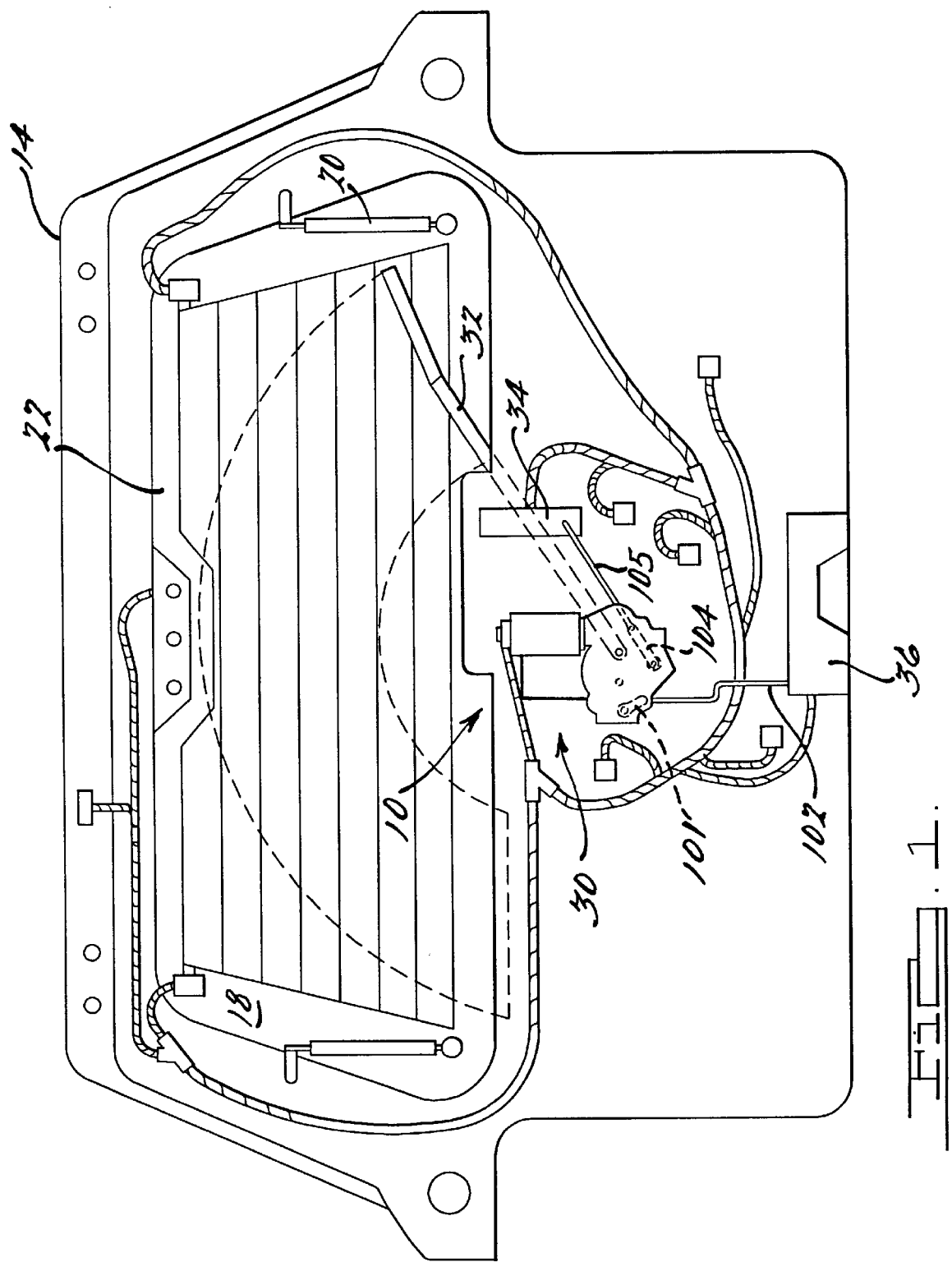
FIG. 1 is a front elevational view of an environment in which the electric motor control system of the present invention is implemented.

Referring to the drawings, FIG. 1 illustrates an electric motor assembly 10 incorporating a motor control system 12 (FIG. 2) according to the present invention. As shown in FIG. 1, an automobile rear liftgate door 14 represents an exemplary environment in which the motor control system of the present invention may be implemented. However, it will be appreciated by one skilled in the art that the motor control system of the present invention may be utilized in any environment in which an electric motor or other similar electromagnetic actuating device is used.

The rear automobile liftgate door 14 can pivot about an upper pair of hinges coupled to a vehicle body structure (not shown). The liftgate door 14 has a rear window or backlite 18 pivotable between a closed position, substantially flush with the outer surface of the liftgate, and an open position about upper hinges (not shown). A pair of pneumatic cylinders 20 act to push a window 22 toward an open position when a lower portion of the window is released. The multi-functional motor assembly 10 is mounted upon an inner surface of the liftgate. The majority of the motor assembly 10 is hidden by an interior trim panel (not shown). The motor assembly shown in FIG. 1 includes a central drive and power transmission unit 30, a window wiper assembly 32, a window release latch or lock 34 and a liftgate lock 36, all of which are mounted on the liftgate.

Figure 2:
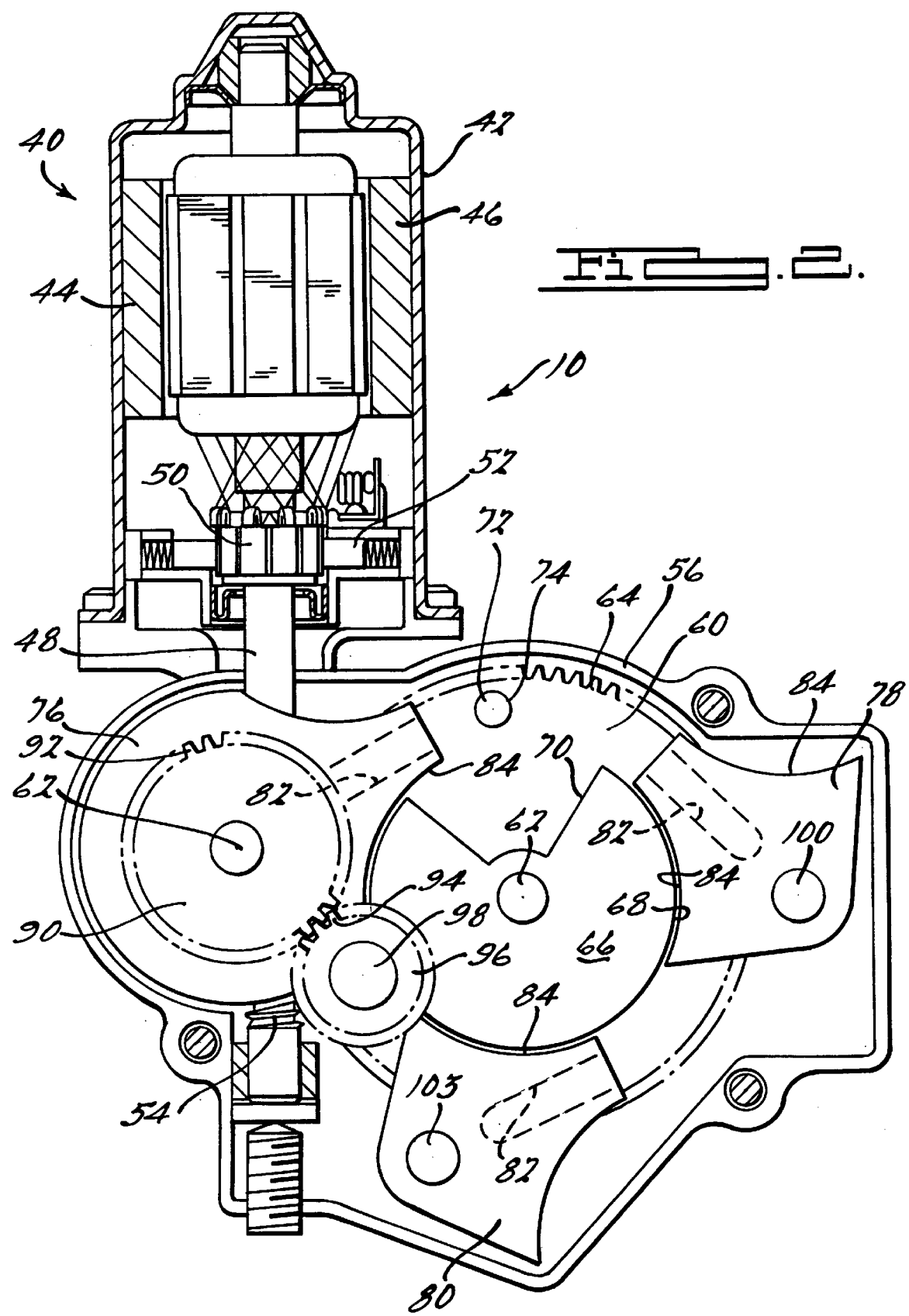
FIG. 2 is a front elevational view in partial cross-section of a motor and motor output gears with which the motor control system of the present invention is implemented.

FIG. 2 illustrates the motor assembly 10 in more detail. The electric motor 40 controlled by the system is preferably a conventional 12 volt fractional horsepower, dc permanent magnet motor. However, it will be appreciated by those skilled in the art that other electric motor constructions are suitable for such motor applications.

The electric motor 40 includes a metallic motor housing 42 within which are stationary permanent magnets 44, a rotatable armature 46 with wire windings, a rotatable armature shaft 48 joined to armature 46, a commutator 50 electrically connected to the wire windings and rotatable with armature shaft 48, a brush card assembly 52 and various electronic components, bushings and retainers. A worm gear segment 54 is provided upon a portion of armature shaft 48 extending beyond motor housing 42.

A gear housing 56 is also provided for receiving worm gear segment 54 and the immediately adjacent portions of armature shaft 48. A main helical gear 60 is also housed and rotatably journalled within gear housing 56. Gear housing 56 is preferably made from cast aluminum. A plurality of knurled steel journalling pins 62 are press fit or otherwise attached within machined openings of gear housing 56. The placement of these openings in relation to each other is important. Pins 62 can alternately be molded as part of plastic gears and cams.

Helical gear 60 has an external set of helically oriented teeth 64 projecting entirely therearound for meshing with worm gear segment 54. A drum 66 is mounted upon a face of helical gear 60 for rotating therewith. Drum 66 has a partially circular peripheral surface 68 interrupted by a clearance indentation 70. Drum 66 and helical gear 60 are coaxially aligned for rotation about their respective journalling pin 62. A drive pin 72 projects from a face of helical gear 60 substantially parallel to the adjacent journalling pin 62. Drive pin 72 has a cylindrical driving interface surface 74 thereabout. Of course, a rotatable sleeve may alternately surround drive pin 72. Other alternate driving interface means may be employed such as an integrally molded finger, screw, rivet, spring, rib, plural projections or other similar formations protruding from a face of peripheral portion of helical gear 60. Helical gear 60 is preferably injection molded from a polymeric material such as acetyl. An electrically conductive feedback disk (not shown) is retained to an inside face of helical gear 60 through ultrasonically rolled welding or insert molding. Feedback disk is comprised of a set of copper alloy or brass alloy stamped contacts which are provided with differing conductive and nonconductive patterns depending on the specific positional ranges as will be discussed in greater detail hereinafter.

A power transmission assembly of central drive and power transmission unit 30 employs three intermittent rotary motion mechanisms or cams 76, 78 and 80. Each cam has a single, linear, external open channel 82 defined by driven interfacing surfaces or walls therein. Driving interface surface 74 of drive pin 72 is selectively engagable against the walls defining channels 82 of each cam. Each cam is rotatable about its respective journalling pin 62. Furthermore, partially circular external surfaces 84 of each cam register with the partially circular peripheral surface 68 of drum 66. A relatively tight tolerance on these registering surfaces of about 1–2 thousandths of an inch is preferably used. Thus, unless each cam is aligned with indentation 70 of drum 66, partially circular peripheral surface 68 of drum 66 will act to prevent rotation of each cam. However, when indentation 70 of drum 66 aligns with an individual cam, concurrently with drive pin 72 engaging within a channel 82 of the same cam, continued rotation of helical gear 60 will cause the selectively coupled cam to rotate therewith. Moreover, the selectively coupled cam will have increased rotational acceleration as drive pin 72 moves closer to journalling pin 62 within channel 82. This rotational acceleration, then deceleration, achieves a desirable inertial ramping up and ramping down effect such that potentially harmful inertial stresses and cyclical fatigue within the device coupled thereto are avoided. The diameter of drive pin 72 should match channel 82 width within half a thousandth of an inch.

Cam 76 additionally has a spur gear 90 stacked coaxially thereupon for simultaneous movement therewith. Spur gear 90 has a peripheral set of teeth 92 extending entirely therearound for enmeshing with a mating external set of teeth 94 extending entirely around a driven pinion gear 96.

Pinion gear 96 rotates the output shaft. The window wiper shaft 98 extends from a rear face of pinion gear 96 for moving in concert therewith. Wiper shaft 98 is attached to pinion gear 96 through rivets, insert molding, knurled press fitting, et cetera. The window wiper arm of wiper assembly 32 is mounted upon wiper shaft 98 in a conventional manner. Wiper shaft is preferably made from cold rolled steel. The system is designed to oscillate wiper assembly 32 at forty-five cycles per minute (round trip) but other cycle frequencies can be achieved.

A protuberance 100 projects from a rear face of cam 78 and engages with a lever 101 which, in turn, is attached to a liftgate lock rod 102. Protuberance 100, lever 101 and rod 102 are also considered to be lock couplings or coupling members. Lock connecting rod 102 is joined to liftgate lock 36 (see FIG. 1) for causing the mechanisms therein to move in response to movement of cam 78. Similarly, a protuberance 103 extends from and moves with a rear face of cam 80. A lever 104 is connected to protuberance 103 for moving therewith. A liftgate window release lock connecting rod 105 connects the lever 104 to liftgate window release lock 34 (see FIG. 1) for causing window releasing movement thereof in response to selective movement of cam 80. Protuberance 103, lever 104 and connecting rod 105 are also defined as liftgate window release lock couplings or coupling members. The above protuberances 101, 103 are preferably secured to their respective levers in a keyholed manner. Additional threaded nuts, push nuts, crimpings, cotter pins and washers or the like (not shown) may be employed to retain the levers to their protrusions. The cams, spur gear and pinion gear are preferably made from powdered metallic steel. Alternately, other coupling means may be employed such as cables, belts, chains, gear sets, multiple linkages, jack screws, rack and pinion gear sets or the like.

Figure 3:
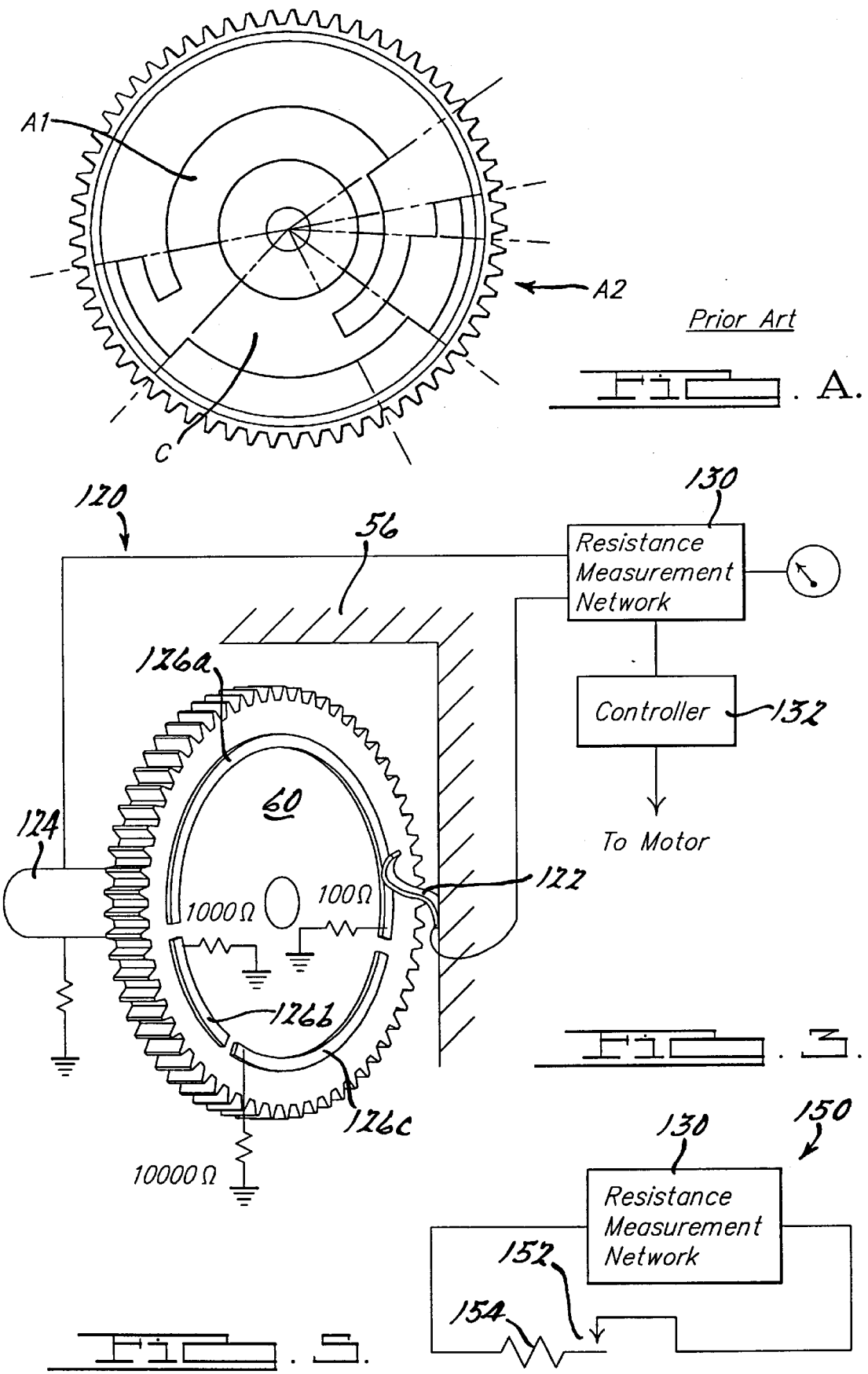
FIG. 3 is a schematic diagram of a first embodiment of the electric motor control system of the present invention.

FIG. 3 illustrates a motor control system according to a first preferred embodiment at 120. The system 120 includes a conductive wiper 122 affixed to the gear housing 56. A plurality of conductive traces 126a–126c is affixed to the helical gear 60. The traces may also be formed in a conventional manner on a printed circuit board, which may be affixed to the housing through board eyelets, or which may be bonded in place. The wiper is isolated from ground, with input directly to the resistance measure, and the conductive traces 126a–126c are connected to ground through the bushing 124, which also has a small associated resistance in the range of 1 to 2 ohms. Each trace has a resistance that varies in relation to the other traces. Each trace is associated with a particular motor application, such as the applications associated with the motor assembly 30 in FIG. 1. For example, the trace 126a may be associated with the operation of the wiper assembly, while the traces 126b, 126c may be associated with the window release latch 34 and liftgate lock 36, respectively. In FIG. 3, the traces vary with respect to one another by an order of resistive magnitude, which is preferably an order of magnitude of 10, with respect to adjacent traces to clearly separate wiper resistance readings.

A resistance measurement network 130 is connected to the output of the wiper contact 122 to measure the resistance of the trace in contact with the wiper during a particular motor application. The resistance measurement network is preferably a bridge network. However, the network may be any commercial off-the-shelf type of resistance measuring device, such as a conventional ohm meter. The resistance measurement network measures the resistance associated with the particular trace contacted by the wiper 122, and generates an output signal to motor controller 132. The motor controller preferably includes a rear node microprocessor such as a Motorola MC68HCO5V6 (or alternately MC68HCO5V7) chip. The controller is electrically connected to a central vehicle microprocessor or controller (Not shown) in a multiplexed (MUX) fashion. A protocol, such as a J1850 MUX protocol, is used. The controller 58 energizes the motor in response to various wiper activation inputs received from the central microprocessor, or from switches such as a liftgate mounted lock switch, a liftgate mounted liftglass release button switch and/or various other positional switches or control knobs, as is well known in the art.

Figure 4:
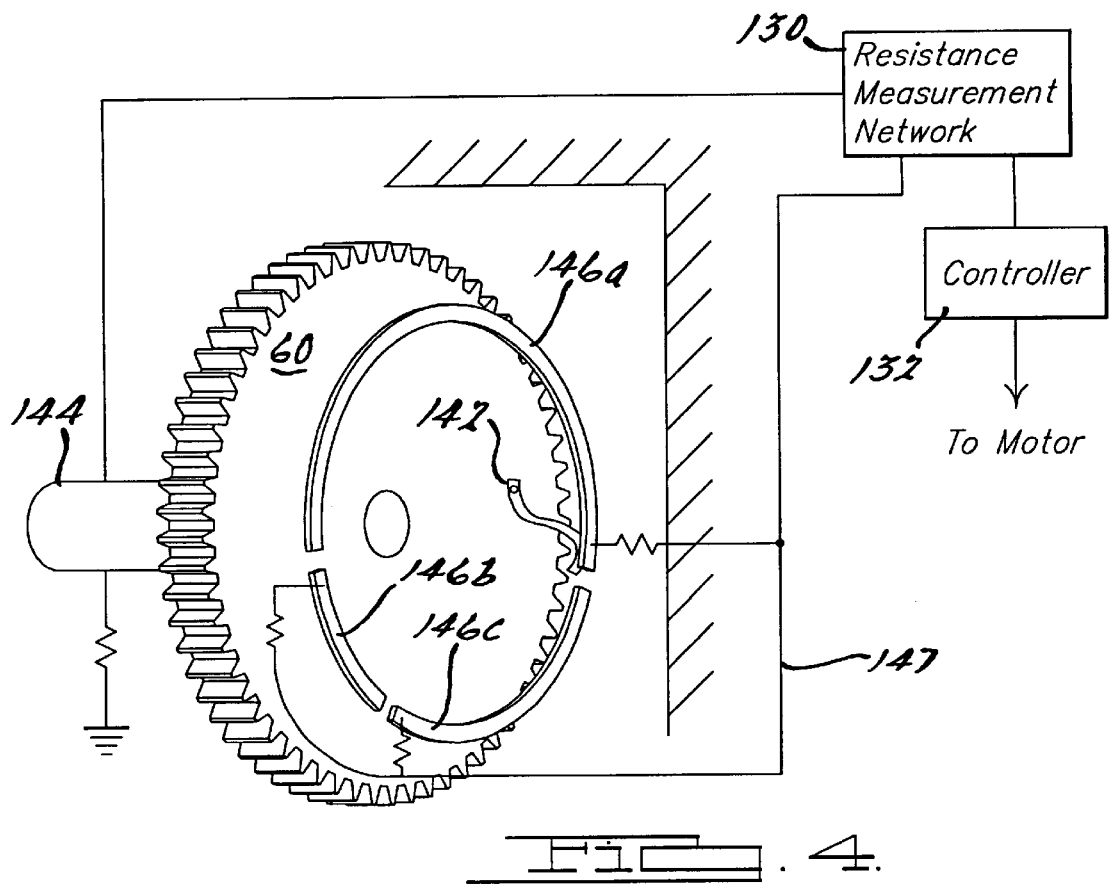
FIG. 4 is a second embodiment of the electric motor control system of the present invention.

FIG. 4 illustrates an embodiment of the present invention at 140 that represents an alternative to the embodiment 120 shown in FIG. 3. The system 140 includes a conductive wiper 142 that is affixed to the helical gear 60 rather than to the gear housing 56. Instead, the traces 146a–146c are affixed to the housing and are connected to the measurement device through a wire 147. As with the traces 126a–126c, the traces 146a–146c may be printed on the housing if the housing is made of a material such as plastic. However, the traces may also be formed in a conventional manner on a printed circuit board, which may be affixed to the housing through board eyelets, or which may be bonded in place. As with the wiper 122, the wiper 142 may be affixed to the helical gear 60 via soldering or any other well known metallic bonding technique such that continuity is achieved through to gear to bushing 144. The resistances of the individual traces 146a–146c vary proportionately with respect to one another, as with the traces 126a–126c.

Figure 5:
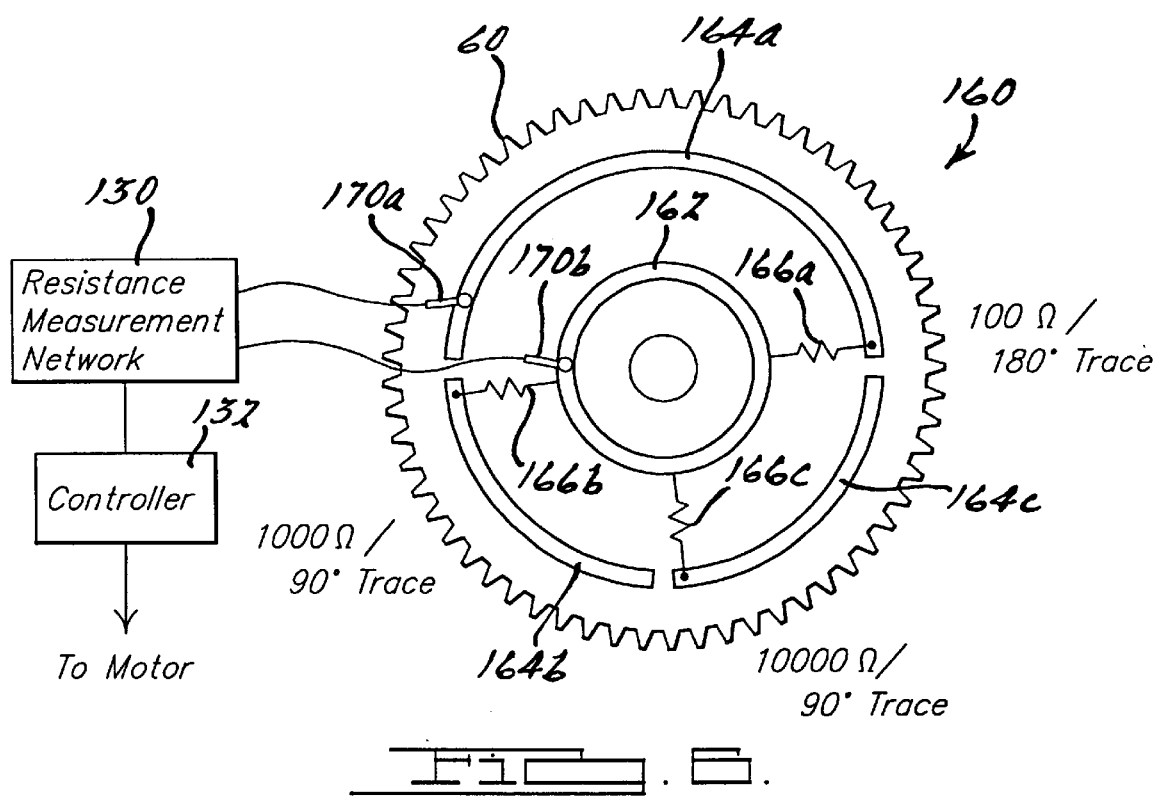
FIG. 5 is a circuit model of the electric motor control systems of FIGS. 3 and 4.

Referring to FIG. 5, operation of the motor control systems 120, 140 will be described with reference to the circuit 150 in FIG. 5. The circuit 150 represents a model of the systems 120, 140. As shown, the wiper 152 completes an electrical circuit when the wiper 152 is brought into operative contact with one of the traces, represented at 154. When a motor application is selected, such as a signal from the wiper assembly 32, the window release lock 34, or the liftgate lock 36, the helical gear 60 is rotated, according to the particular application selected. As the helical gear 60 is rotated to a position dictated by the selected application, the wiper 152 is brought into contact with the trace 154 associated with the selected application. The electrical circuit 150 is thus completed, and the resistance measurement network 130 generates a small voltage through a resistive bridge, thereby causing a measurable voltage potential across system resistance 154. The network 130 then measures this voltage drop using conventional resistance measurement techniques. The controller then uses the measured resistance value to determine which trace is in electrical contact with the wiper, and thus which application is being driven by the motor. The network 130 then outputs the signal indicative of the sensed resistance to the motor controller 132, which is programmed with motor control techniques according to desired motor control parameters.

Referring to FIG. 6, a third preferred embodiment of the motor control system of the present invention is shown at 160. The system 160 includes an inner trace 162 composed of highly conductive material such as copper affixed to the helical gear 60, as previously described with traces 126a–126c and 146a–146c. The system 160 also includes a plurality of outer traces 164a–164c having a different radius than the trace 162 and electrically connected to the inner trace via resistors 166a–166c at a common rotation end. It should be noted that the highly conductive trace could also be located at a larger radius or even on the other face of the gear. The resistors 166a–166c vary in resistance with respect to one another preferably by an order of magnitude. For example, the resistor 166a may be 100 ohms, the resistor 166b may be 1,000 ohms, and the resistor 166c may be 10,000 ohms.

The system 160 also includes two wipers 170a, 170b. The wiper 170a is in constant electrical contact with the inner trace 162, while the outer wiper 170b is in selective electrical contact with one of the outer traces 166a–166c. The wipers 170a, 170b complete a circuit across one of the resistors 166a–166c and through a percentage of corresponding traces 164a–164c depending upon the particular motor application selected. The outer traces 164a–164c are each associated with a particular motor application, as with the above described systems showing FIGS. 3 and 4. The system 160 has the specific advantage of measuring the associated trace resistance directly without possible variable resistor paths through bushings and housings. Also, the measuring brushes can be packaged together in a compact, durable assembly. The system 160 may also be implemented by affixing the traces 162 and 164a–164c on the gear housing, and affixing the wipers 170a–170b on the helical gear 60, as should be appreciated by one skilled in the art. The brush elements would be connected together by a highly conductive material, and the resistor elements 166a–166c would connect directly to the measurement network (130) for the first input, as would trace 162 for the second output for this configuration.

Figure 7:
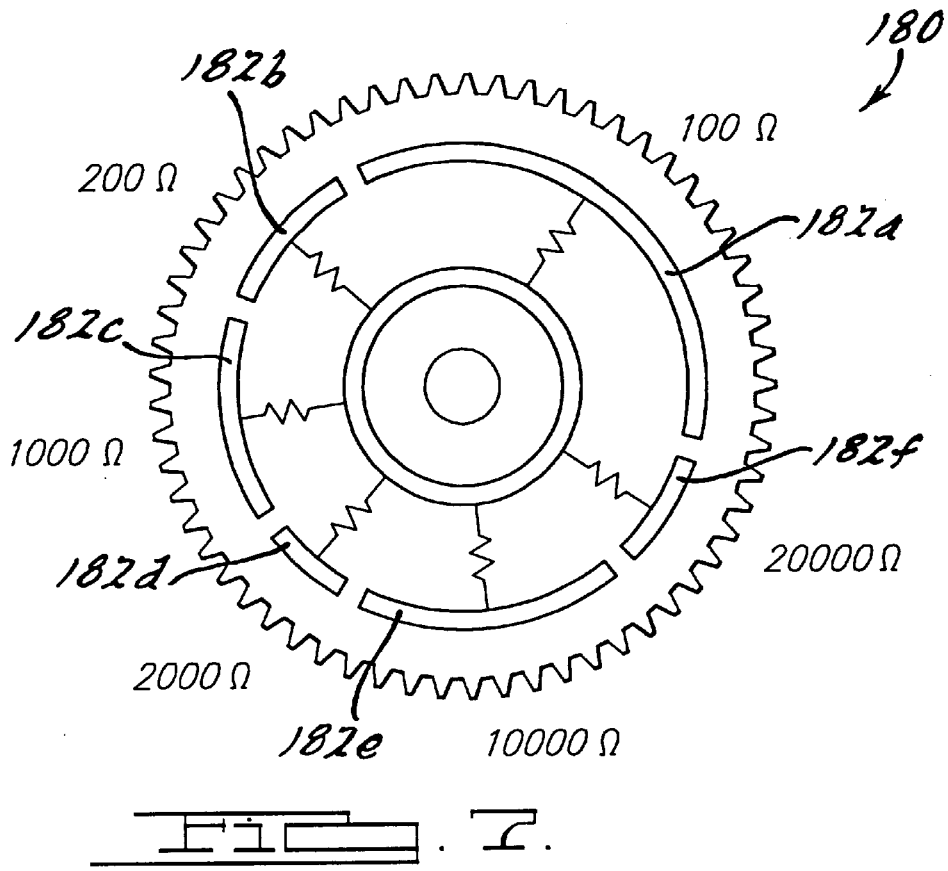
FIG. 7 is a schematic diagram of a fourth embodiment of the present invention.

Referring to FIG. 7, yet another alternative embodiment of the present invention is shown at 180. The embodiment as shown in 180 is similar to the system 160. The embodiment 180 illustrates that the system of the present invention may be utilized to determine operational parameters associated with any number of motor applications for a multi-function motor. The system 180 as shown includes conductive traces 182a–182f, with each trace being associated with a particular motor application.

Figure 8:
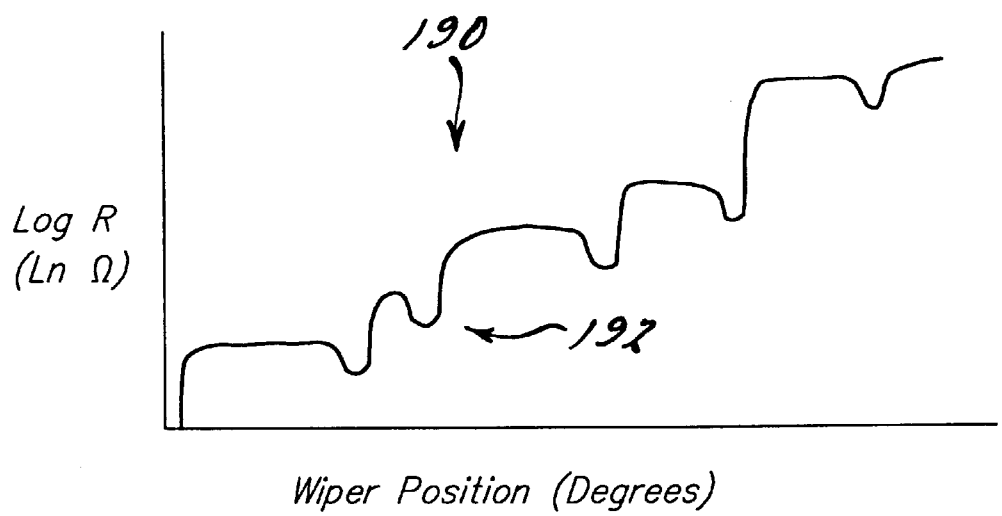
FIG. 8 is a graph of resistance versus contact wiper position for the motor control system shown in FIG. 7.

FIG. 8 illustrates at 190 resistive characteristics measured by the resistance measurement network associated with the motor control system of the present invention. As shown, the natural log of the measured resistance is plotted versus wiper position on the helical gear. The downward portions of the graph, such as the portion 192, are caused by the wiper associated with contacting one of the outer traces contacting two of the traces at once, thereby reducing overall resistance, as each of the resistors associated with the two traces are in parallel with one another.

Figure 9:
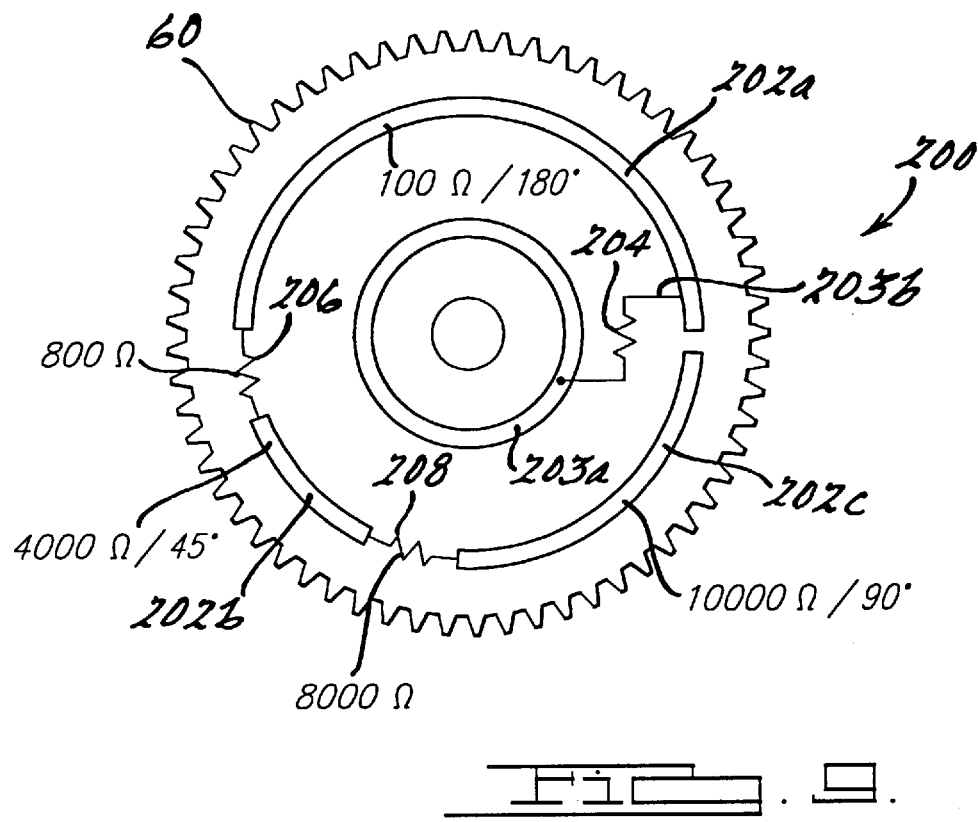
FIG. 9 is a schematic diagram of a fifth embodiment of the present invention.

FIG. 9 illustrates another embodiment of the motor control system of the present invention at 200. The system 200 includes a configuration of traces 202a–202c affixed to the helical gear 60. Trace 202a, which has an associated consistent total resistance of, for example 100 ohms, is connected to inner highly conductive trace 203a through resistor 203b at 204 and is connected to trace 202b through resistor 206. The resistor 202b in turn is connected to trace 202c via resistor 208. The system 200 thereby effectively functions as a potentiometer when the system conductive wiper contacts one of the traces 202a–202c, with the resistance of the system constantly increasing as shown graphically in FIG. 10 in a counter-clockwise manner. It is contemplated that the resistance of the system 200 may alternatively increase in a clockwise manner and that different resistance can be used.

Figure 10:
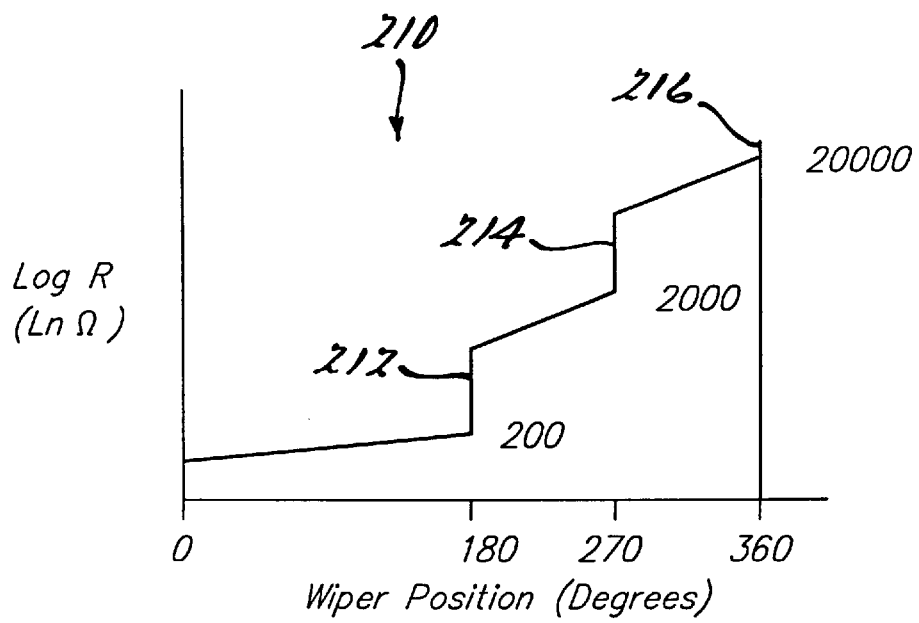
FIG. 10 is a graph of resistance versus contact wiper position for the motor control system shown in FIG. 9.

FIG. 10 graphically illustrates the resistive characteristics of the system 200 at 210. As shown, the resistance gradually increases along each of the traces, and then jumps in value at each of the resistive junctions 204, 206, 208 as indicated graphically at 212, 214, 216, respectively.

While various embodiments of this electric motor control system have been disclosed, it will be appreciated that various modifications may be made without departing from the present invention. For example, the system may be used to monitor the output of a solenoid, electromagnet or other electromagnetic devices used in place of the previously described electric motor system. It will further be appreciated that the electric motor control system of the present invention may be used in conjunction with a variety of other multiplexed or non-multiplexed, microprocessor or analog circuitry used to control the multifunctional motor system.

The electric motor control system of the present invention may also be used to control an electric motor that selectively drives other known intermittent motion mechanisms such as more conventional Geneva mechanisms, intermittent gearing, escapements, ratchet mechanisms or other known selectively actuable devices. For example, reference should be made to the following U.S. patents which are incorporated by reference herewithin: U.S. Pat. Nos. 5,228,239 entitled "System for Automatically Opening and Closing Doors of Vehicles" which issued to Heo on Jul. 20, 1993; 4,352,299 entitled "Intermittent Motion Gear Apparatus" which issued to Riggs et al. on Oct. 5, 1982; 3,443,455 entitled "Intermittent Motion Device" which issued to Zugel on May 13, 1969; 3,443,442 entitled "Selectively Operable Intermittent Motion Apparatus" which issued to Schweihs on May 13, 1969; 3,442,146 entitled "Intermittent Rotary Motion" which issued to Simpson on May 6, 1969; and 3,421,380 entitled "Intermittent Motion Apparatus" which issued to Mansour on Jan. 14, 1969.

The electric motor control system of the present invention may also be used to monitor electric motors that drive front windshield wipers, side door locks or other automotive vehicle and non-automotive vehicle applications.

It should be appreciated that the electric motor control system of the present invention simplifies system configuration when the resistance network is compared to conventional continuity measurement based motor control systems. The electric motor control system of the present invention therefore significantly reduces associated cost of components required to implement the system, and system assembly and wiring costs. The motor control system of the present invention also exhibits a high degree of reliability and accuracy also in comparison to present resistance network based motor control systems.

Various materials have been disclosed in an exemplary fashion, however, other materials may of course be employed. It is intended by the following claims to cover these and any other departures from the disclosed embodiments which fall within the true spirit of this invention.

The invention claimed is:

1. An electric motor system, comprising:

an electric motor including a motor housing;

a gear mechanism coupled to the electric motor that selectively connects the motor to a motor application;

a plurality of resistive contacts located on the motor housing and arranged in a predetermined pattern to indicate motor operational data;

a controller connected to the motor and programmed to control operation of the motor;

a first contact mechanism connected to the gear mechanism that selectively contacts one of the plurality of resistive contacts; and a resistance measuring device connected between the contact mechanism and the controller that generates a sensed resistance signal and that communicates the sensed resistance signal to the controller for motor control to enable the controller to determine absolute motor output position.

2. The system according to claim 1, wherein the plurality of resistive contacts comprises a plurality of resistive traces each radially disposed around the gear mechanism at a first radius.

3. The system according to claim 2, wherein the plurality of resistive contacts further comprises a continuous conductive trace radially disposed around the gear mechanism and having a second radius different than the first radius.

4. The system according to claim 3, further comprising a second contact mechanism connected to the gear mechanism, the first contact mechanism selectively contacting one of the plurality of resistive contacts radially disposed around the gear mechanism at the first radius, the continuous contact mechanism being in continuous contact with the second conductive trace radially disposed around the gear mechanism at the second radius, the first and second contacts completing an electrical circuit when the first contact mechanism selectively contacts one of the plurality of resistive contacts at the first radius, thereby causing a voltage drop across the first and second contacts, the resistance measuring device measuring the voltage drop to determine the resistance associated with the resistive trace contacted by the first contact mechanism or other measurement device.

5. The system according to claim 1, wherein the plurality of resistive contacts comprises a plurality of resistive traces each radially disposed around the gear mechanism at a predetermined radius.

6. The system according to claim 5, wherein each of the plurality of resistive traces has a resistance value that varies in direct proportion to each adjacent resistive trace.

7. The system according to claim 6, wherein each of the plurality of resistive traces varies in resistance with respect to each adjacent resistive trace by a factor of ten.

8. The system according to claim 7, wherein each of the plurality of resistive traces is interconnected to an adjacent resistive trace via a resistor, the plurality of interconnected resistive traces forming a potentiometer which has a continuous and equivalent resistance degree of arc throughout its length.

9. The system according to claim 1, wherein each of the plurality of resistive contacts corresponds directly to a particular motor application, the first contact mechanism contacting one of the plurality of resistive contacts that correspond to a selected motor application.

10. The system according to claim 1, wherein the plurality of resistive contacts comprises a plurality of resistive traces printed on a printed circuit board.

11. An electric motor system, comprising:
   an electric motor including a motor housing;
   a gear mechanism coupled to the electric motor that selectively connects the motor to a motor application;
   a plurality of resistive contacts located on the gear mechanism and arranged in a predetermined pattern to indicate motor positional data;
   a controller connected to the motor programmed to control operation of the motor;
   a first contact mechanism connected to the motor housing that selectively contacts one of the plurality of resistive contacts; and
   a resistive measuring device connected between the wiper and the controller that generates a sensed resistance signal that communicates the sensed resistance signal to the controller to enable the controller to determine absolute motor output position.

12. The system according to claim 11, wherein the plurality of resistive contacts comprises the plurality of resistive traces each radially disposed around the gear mechanism at a first radius.

13. The system according to claim 12, wherein the plurality of resistive contacts further comprises a second highly conductive trace radially disposed around the gear mechanism and having a second radius different than the first radius.

14. The system according to claim 13, further comprising a second contact mechanism connected to the gear mechanism, the first contact mechanism selectively contacting one of the plurality of resistive contacts radially disposed around the gear mechanism at the first radius, the second contact mechanism being in continuous contact with the second conductive trace radially disposed around the gear mechanism at the second radius, the first and second contacts completing an electrical circuit when the first contact mechanism selectively contacts one of the plurality of resistive contacts at the first radius thereby causing a circuit across the first and second contacts, the resistance measuring device measuring the circuit to determine the resistance associated with the resistive trace contacted by the first contact mechanism.

15. The system according to claim 11, wherein the plurality of resistive contacts comprises a plurality of resistive traces each radially disposed around the gear mechanism at a predetermined radius.

16. The system according to claim 15, wherein each of the plurality of resistive traces has a resistance value that varies in direct proportion to each adjacent resistive trace.

17. The system according to claim 16, wherein each of the plurality of resistive traces vary from each adjacent resistive trace by a factor of ten.

18. The system according to claim 17, wherein each of the plurality of resistive traces is connected to an adjacent resistive trace via a resistor, the plurality of interconnected resistive traces forming a potentiometer that circumferentially varies in resistance.

19. The system according to claim 11, wherein each of the plurality of resistive contacts corresponds directly to a particular motor application, the first contact mechanism contacting one of the plurality of resistive contacts that correspond to a selected motor application.

20. The system according to claim 11, wherein the plurality of resistive contacts comprise a plurality of resistive traces printed on a printed circuit board.

21. A resistance measurement circuit for a control system for a multifunctional apparatus, comprising:
   an apparatus housing;
   a gear mechanism coupled to the apparatus that selectively connects the apparatus to one of a plurality of applications;
   a plurality of resistive traces located on the housing and arranged in a predetermined pattern, such that each of the plurality of resistive traces corresponds to a specific application;
   a controller connected to the apparatus that is programmed to control operation of the apparatus;
   a first contact mechanism connected to the gear mechanism to selectively contact one of the plurality of resistive traces corresponding to a selected application; and
   a resistance measuring device connected between the contact mechanism and the controller that generates a sensed resistance signal and that communicates the sensed resistance signal to the controller for apparatus control purposes.

22. The system according to claim 21, wherein the apparatus comprises an electric motor.

23. A resistance measurement circuit for a control system for a multifunctional apparatus, comprising:

an apparatus housing;

a gear mechanism coupled to the apparatus that selectively connects the apparatus one of a plurality of applications;

a plurality of resistive traces located on the gear mechanism and arranged in a predetermined pattern, such that each of the plurality of resistive traces corresponds to a specific application;

a controller connected to the apparatus that is programmed to control operation of the apparatus;

a first contact mechanism connected to the housing to selectively contact one of the plurality of resistive traces corresponding to a selected application; and a resistive measuring device connected between the contact mechanism and the controller that generates a sensed resistance signal and that communicates the sensed resistance signal to the controller for apparatus control purposes.

24. The circuit according to claim 23, wherein the apparatus comprises an electric motor.

25. The circuit according to claim 24, wherein the electric motor is implemented in a rear wiper assembly in a motor vehicle.

* * * * *